United States Patent [19]
Schmidt et al.

[11] Patent Number: 5,540,528
[45] Date of Patent: Jul. 30, 1996

[54] RIVET MADE OF PLASTIC MATERIAL FOR SECURING A PLATE-LIKE WORKPIECE TO A SUPPORT ASSEMBLY WITH AN APPROXIMATELY PLANE SURFACE

[75] Inventors: Hans-Günter Schmidt, Itzehoe; Karl Wörner, Uhingen-Sparwiesen, both of Germany

[73] Assignee: ITW-ATECO GmbH, Norderstedt, Germany

[21] Appl. No.: 388,927

[22] Filed: Feb. 15, 1995

[30] Foreign Application Priority Data

Feb. 15, 1994 [DE] Germany ............... 44 04 746.0

[51] Int. Cl.[6] .................. F16B 13/06; A44B 1/04
[52] U.S. Cl. ................. 411/55; 411/41; 411/48; 411/60; 24/297
[58] Field of Search .................. 411/41, 45, 46, 411/48, 55, 60, 908; 24/297

[56] References Cited

U.S. PATENT DOCUMENTS

| | | | |
|---|---|---|---|
| 4,114,509 | 9/1978 | Poe | 411/60 |
| 4,715,095 | 12/1987 | Takahashi | 24/297 X |
| 4,861,208 | 8/1989 | Boundy | 24/297 X |
| 4,878,791 | 11/1989 | Kurihara et al. | 411/41 X |
| 4,987,656 | 1/1991 | Sato | 24/297 |
| 5,173,026 | 12/1992 | Cordola et al. | 411/369 X |

*Primary Examiner*—Neill R. Wilson
*Attorney, Agent, or Firm*—Schwartz & Weinrieb

[57] ABSTRACT

A rivet made of plastic material for securing a plate-like workpiece to a support assembly with an approximately plane surface comprises a shank having a hollow axial passage and at least two axially parallel slots open towards the free end of the shank, the shank portions formed thereby comprising at the outer sides thereof ramp-like portions projecting obliquely outwardly and downwardly, with the axial passage tapering towards the free end of the shank, a first plate-shaped flange at the other end of the shank, the flange having at its under-surface an annular relatively sharp sealing edge engaging the surface of the support assembly when the shank is inserted into an opening of the support assembly, a second plate-shaped flange upon the side of the first flange opposite to the shank and axially spaced therefrom, and an expansion member having an annular sealing rib at its upper end, the annular sealing rib being sealingly engaged with the axial passage, when the expansion member is driven into the passage.

22 Claims, 1 Drawing Sheet

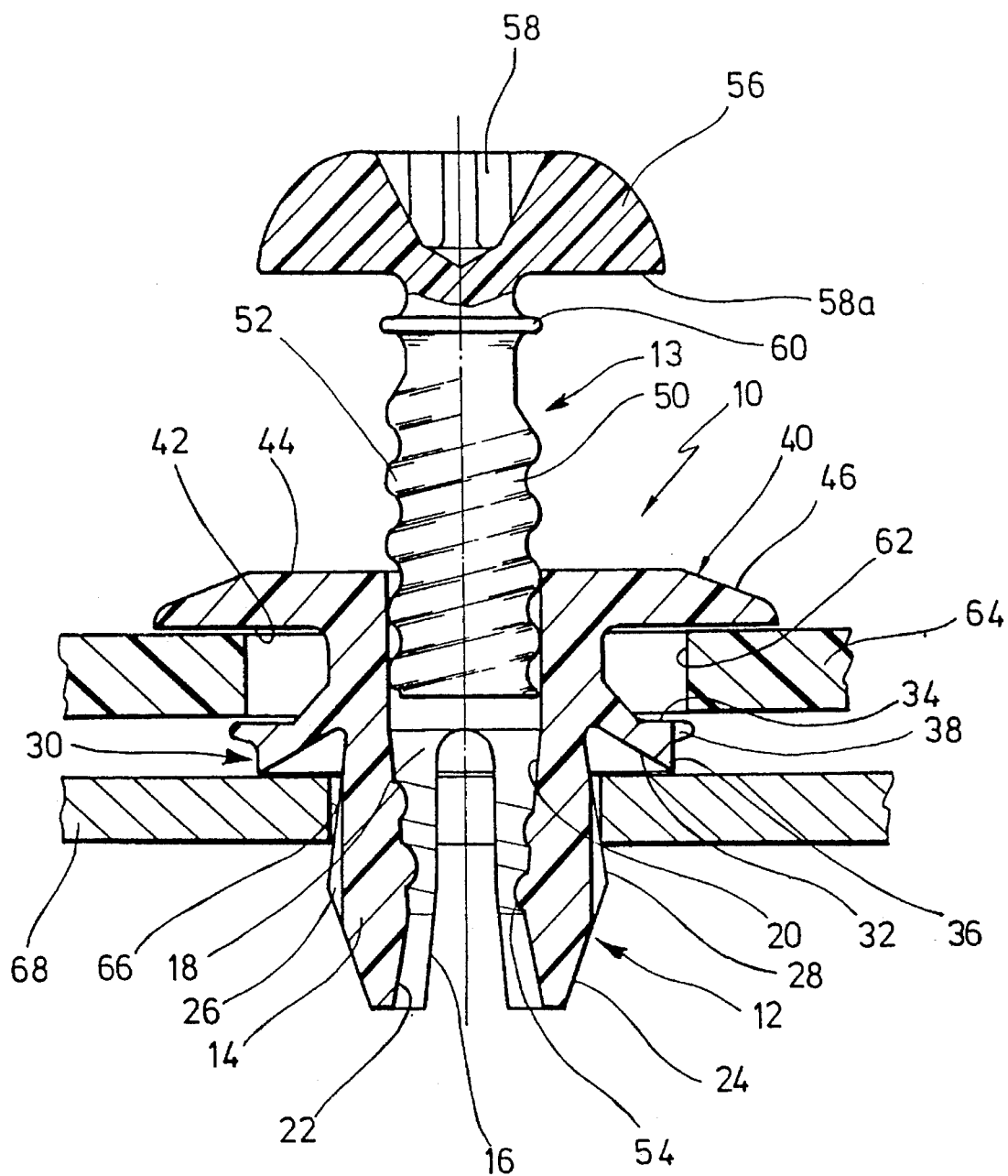

RIVET MADE OF PLASTIC MATERIAL FOR SECURING A PLATE-LIKE WORKPIECE TO A SUPPORT ASSEMBLY WITH AN APPROXIMATELY PLANE SURFACE

FIELD OF THE INVENTION

The invention relates to a rivet made of plastic material for securing a plate-like workpiece to a support assembly with an approximately plane surface.

BACKGROUND OF THE INVENTION

There are known plastic rivets comprising a hollow shank and a flange-like head arranged at one end of the shank. The shank comprises at least two axially parallel slots open towards the free end and ramp-like portions upon the outer sides which engage a plate-like workpiece from below when the rivet is inserted into the opening of the workpiece and is expanded with the aid of an expansion member driven into the axial passage. With the aid of the plate-shaped head, a second plate-like workpiece is pressed against the first one. Such rivets are very versathe in use.

OBJECT OF THE INVENTION

It is the object of the invention to provide a rivet for securing a plate-like workpiece to a support assembly with an approximately plane surface which, at the same time, efficiently seals the opening of the support assembly receiving the rivet against moisture.

SUMMARY OF THE INVENTION

According to the invention, the rivet comprises a plate-shaped flange, the outer diameter of which is smaller than the diameter of the plate-like workpiece for receiving the rivet. The plate-shaped flange is provided with an annular relatively sharp edge pointing downwardly which sealingly engages to the flat outer surface of the support assembly when an expansion member is driven into the rivet. In this way, moisture at the outside of the support assembly is not capable of penetrating into the hole receiving the rivet.

According to the invention, the expansion member has an annular rib which is sealingly engaged with the axial passage. Thus, the inner passage of the rivet is sealed as well and moisture cannot get through the accommodation hole of the rivet in the support assembly to the other side of the support assembly. The inventive rivet, for instance, can serve the purpose of securing a plastic covering to a car body portion. The sealed rivet prevents moisture from penetrating through the opening of the car body.

It is true that the plate-shaped flange comprising the sealing edge does not allow the plate-like workpiece to directly engage to the support assembly but this is not necessary in many fields of application.

According to an embodiment of the invention, the expansion member comprises an external thread engaged with thread portions upon the inner surface of the shank portions. The expansion member comprising a thread has the advantage that it can be removed from the rivet. This is very difficult for any expansion members comprising a smooth shank, especially, if the other side of the support assembly is not accessible. The thread portions provided within the axial passage are preferably, formed as protrusions limited in the peripheral direction. Preferably, a rounded thread is provided. In this case, the thread portions are formed accordingly.

According to another embodiment of the invention, the plate-shaped flange is shaped as a conical disc. Consequently, it exhibits a certain spring action when the sealing edge is pressed against the facing outer surface of the support assembly while driving in the expansion member.

As already mentioned before, it is necessary that the diameter of the first plate-shaped flange be equal to or slightly smaller than the diameter of the opening of the workpiece. According to an embodiment of the invention, the plate-shaped flange comprises at least one radial resilient protrusion which is transiently deformed when the shank is inserted into the plate opening. This protrusion allows the rivet to be preassembled on the plate-like workpiece without falling out when using said plate-like workpiece.

With respect to an external thread of the expansion member of the rivet, the diameter of the axial passage above the constriction is equal to or slightly larger than the outer diameter of the thread. Consequently, over a certain distance the threaded shank of the expansion member can be axially driven into the axial passage so as to reach the thread portions of the shank. Thereafter, it is moved forward by rotation, with the ramp-like portions being forced into engagement with the opposite sides of the support assembly.

According to another embodiment of the invention, the expansion member comprises a flange-like head, preferably with a flat under-surface, and has an engagement portion, such as, for example, a hexagonal socket, for a rotary tool.

Various other objects, features, and attendant advantages of the present invention will be more fully appreciated from the following detailed description when considered in connection with the accompanying drawing, wherein:

The SOLE FIGURE is a cross-sectional view of the new and improved rivet constructed in accordance with the principles of the present invention, wherein the expansion member is shown as being only partially inserted within the shank portion of the rivet.

DETAILED DESCRIPTION OF THE PREFERRED EMBODIMENT

A rivet 10 comprises a shank portion 12 as well as a an expansion member 13. The shank portion 12 comprises an approximately cylindrical shank 14 which at its bottom part is divided into individual sections by at least one axially extending slot 16 which opens downwardly. The hollow shank comprises an axial passage 18 which tapers downwardly from the beginning of the slot 16, as indicated at 20. At its bottom part, the passage 18 diverges at 22. The outer surface of the shank 14 at its bottom part is conically constricted, as indicated at 24.

As indicated at 26, the shank 14 upon the outer surfaces thereof has a plurality of ramp-like portions spaced in the peripheral direction and comprising a ramp surface 28 extending obliquely outwardly and downwardly. Above the ramp portions 26 a first plate-shaped flange 30 is molded on the shank 14. At the bottom side at 32 it is shaped as a conical disc while at the upper side it comprises a radially extending plane surface 34. The bottom side 32 at its outer end has a relatively sharp sealing edge 36. Furthermore, a plurality of radially protruding resilient projections spaced in the peripheral direction are molded on the plate-shaped flange 30, one of which is shown at 38. A second plate-shaped flange 40 axially spaced from the first plate-shaped flange 30 is molded on the shank 14, the diameter of which is significantly larger than the diameter of the first flange 30. It has planar parallel stirfaces 42, 44 at its bottom and upper sides as well as an oblique surface 46 interconnecting and extending between the lower side and at the tipper side.

The expansion member 13 comprises a threaded shank 50 having a rounded thread 52, the outer diameter of which above the constriction 20 corresponds to the inner diameter of the passage 18. The rounded thread 52 is engaged with corresponding thread portions 54 which are formed within the tapered area 20 of the passage 18. Moreover, the expansion member 13 comprises a flange-like head 56 having a hexagonal socket 58. The head 56 comprises a flat under-surface 58a. Between the under-surface 58a and the thread 52 an annular sealing rib 60 is molded on the shank 50 which sealing rib 60 is designed so as to sealingly engage with the axial passage 18 of the shank 14.

As can be seen, the shank portion 12 is arranged within an opening 62 of a plate 64 made of plastic material, with the under-surface 42 of the flange portion 40 engaging the upper-surface of the plate 64. The protrusions 38 which are capable of engaging the under-surface of the plate 64 prevent the shank portion 12 from falling out of the opening 62. As can be seen, the shank portion 12 in this way can be preassembled in the opening 62 of the plate 64. The protrusions 38 are deformed when being inserted into the opening 62 so as to be capable of being led through the opening 62. After recovering from the deformation the protrusions 38 return to their original unstressed states and, as mentioned before, prevent the shank portion from becoming separated from the plate 64.

The plate 64 together with the preassembled shank portion 12 and the expansion member 13 possibly inserted already are inserted into an opening 66 of a metal plate 68 in the position shown in the drawing. At such position the sealing edge 36 engages the facing upper-surface of the metal plate 68. If now the expansion member 13 is axially driven even further and is rotated thereafter, the ramp-like portions 28 engage the under-surface of the metal plate 68 so as to cause a the shank portion 12 to provide a tensile stress in the direction of assembly and cause the sealing edge 36 to be pressed against the upper-surface of the metal plate 68. In this way, moisture is prevented from penetrating from the upper-surface of the metal plate 68 into the opening 66. The sealing rib 60 prevents moisture from penetrating through the axial passage 18.

Obviously, many modifications and variations of the present invention are possible in light of the above teachings. It is therefore to be understood that within the scope of the appended claims, the present invention may be practiced otherwise than as specifically described herein.

We claim:

1. A rivet assembly for securing a workpiece to a support plate in a sealed manner, comprising:

a shank member having an axial passage defined therethrough, and slot means defined within a free end portion of said shank member so as to render said free end portion of said shank member expansible;

a workpiece having an aperture defined therein;

a support plate having an aperture defined therein for receiving said free end portion of said shank member;

a first flange member integrally formed upon said shank member adjacent the end portion of said shank member which is disposed opposite said free end portion thereof, said first flange member including means thereon for sealingly engaging a first surface of said support plate when said shank member is disposed within said aperture of said support plate so as to prevent the ingress of foreign matter into said aperture of said support plate;

a second flange member integrally formed upon said shank member at said end portion of said shank member which is disposed opposite said free end portion thereof for engaging a first surface of said workpiece so as to positionally retain said workpiece with respect to said support plate; and an expansion member disposed within said axial passage of said shank member for expanding said expansible free end portion of said shank member into engagement with a second surface of said support plate so as to lockingly retain said shank member within said aperture of said support plate, said expansion member having means disposed thereon for sealingly engaging said axial passage of said shank member, when said expansion member is disposed within said axial passage of said shank member, so as to prevent the ingress of foreign matter into said axial passage of said shank member.

2. The assembly set forth in claim 1, wherein:

said shank member and said expansion member are fabricated from a plastic material.

3. The assembly set forth in claim 1, wherein said axial passage of said shank member is tapered radially inwardly within said free end portion of said shank member such that said free end portion of said shank member is caused to be expanded radially outwardly when said expansion member encounters said tapered portion of said axial passage of said shank member as said expansion member is axially inserted into said axial passage of said shank member.

4. The assembly set forth in claim 1, wherein:

said first and second flange members are axially spaced along said shank member; and said workpiece is interposed and captured between said first and second flange members.

5. The assembly set forth in claim 1, wherein:

said means upon said first flange member for sealingly engaging said first surface of said support plate comprises an annulus having a sharp sealing edge which together with said first flange member has the configuration of a frustoconical disk.

6. The assembly set forth in claim 1, further comprising:

flexible projections disposed upon said first flange member for flexibly deforming so as-to permit said first flange member to pass through said aperture defined within said workpiece and for engaging a second surface of said workpiece after said first flange member has passed through said aperture of said workpiece.

7. The assembly as set forth in claim 1, wherein:

said means of said expansion member for sealingly engaging said axial passage of said shank member comprises an annular rib for sealingly engaging an internal peripheral wall portion of said axial passage of said shank member when said expansion member is inserted into said axial passage of said shank member.

8. The assembly as set forth in claim 7, wherein:

said free end portion of said shank member has first thread means formed upon interior sidewall portions thereof which partially define said axial passage; and said expansion member has second thread means formed upon exterior peripheral surface portions thereof for threadedly engaging said first thread means of said free end portion of said shank member when said expansion member is inserted within said axial passage of said shank member.

9. The assembly set forth in claim 8, wherein:

said expansion member comprises a flanged head portion having socket means defined therein for receiving a rotary tool for rotating said expansion member so as to threadedly engage said expansion member within said shank member as a result of threaded engagement of said first and second thread means of said shank member and said expansion member, respectively.

10. The assembly set forth in claim 1, wherein:

said support plate comprises a vehicle car body; and said workpiece comprises a plastic vehicle covering.

11. A rivet for securing a first panel member, having a first aperture defined therein, to a second panel member, having a second aperture defined therein, in a sealed manner, comprising:

a shank member having an axial passage defined therethrough, and slot means defined within a free end portion of said shank member so as to render said free end portion of said shank member expansible;

a first flange member integrally formed upon said shank member adjacent the end portion of said shank member which is disposed opposite said free end portion thereof, said first flange member including means thereon for sealingly engaging a first surface of said second panel member when said shank member is disposed within said aperture of said second panel member so as to prevent the ingress of foreign matter into said aperture of said second panel member;

a second flange member integrally formed upon said shank member at said end portion of said shank member which is disposed opposite said free end portion thereof for engaging a first surface of said first panel member so as to positionally retain said first panel member with respect to said second panel member; and an expansion member disposed within said axial passage of said shank member for expanding said expansible free end portion of said shank member into engagement with a second surface of said second panel member so as to lockingly retain said shank member within said aperture of said second panel member, said expansion member having means disposed thereon for sealingly engaging said axial passage of said shank member, when said expansion member is disposed within said axial passage of said shank member, so as to prevent the ingress of foreign matter into said axial passage of said shank member.

12. The rivet as set forth in claim 11, wherein:

said shank member and said expansion member are fabricated from a plastic material.

13. The rivet as set forth in claim 11, wherein:

said axial passage of said shank member is tapered radially inwardly within said free end portion of said shank member such that said free end portion of said shank member is caused to be expanded radially outwardly when said expansion member encounters said tapered portion of said axial passage of said shank member as said expansion member is axially inserted into said axial passage of said shank member.

14. The rivet as set forth in claim 11, wherein:

said first and second flange members are axially spaced along said shank member such that said first panel member is interposed and captured between said first and second flange members.

15. The rivet as set forth in claim 11, wherein:

said means upon said first flange member for sealingly engaging said first surface of said second panel member comprises an annulus having a sharp sealing edge portion which together with said first flange member has the configuration of a frustoconical disk.

16. The rivet as set forth in claim 11, further comprising:

flexible projections disposed upon said first flange member for flexibly deforming so as to permit said first flange member to pass through said aperture defined within said first panel member and for engaging a second surface of said first panel member after said first flange member has passed through said aperture of said first panel member.

17. The rivet as set forth in claim 11, wherein:

said means of said expansion member for sealingly engaging said axial passage of said shank member comprises an annular rib for sealingly engaging an internal peripheral wall portion of said axial passage of said shank member when said expansion member is inserted into said axial passage of said shank member.

18. The rivet as set forth in claim 17, wherein:

said free end portion of said shank member has first thread means formed upon interior sidewall portions thereof which partially define said axial passage; and said expansion member has second thread means formed upon exterior peripheral surface portions thereof for threadedly engaging said first thread means of said free end portion of said shank member when said expansion member is inserted within said axial passage of said shank member.

19. The rivet as set forth in claim 18, wherein:

said expansion member comprises a flanged head portion having socket means defined therein for receiving a rotary tool for rotating said expansion member so as to threadedly engage said expansion member within said shank member as a result of threaded engagement of said first and second thread means of said shank member and said expansion member, respectively.

20. The rivet as set forth in claim 18, wherein:

interior sidewall portions of said axial passage of said shank member within said end portion of said shank member which is disposed opposite said free end portion of said shank member are non-threaded, and the diametrical extent of said non-threaded portion of said axial passage is greater than the diametrical extent of said threaded expansion member such that said threaded expansion member may be initially axially translated within said non-threaded end portion of said axial passage and subsequently threadedly engaged with said first thread means of said axial passage within said free end portion of said shank member.

21. The assembly as set forth in claim 9, wherein:

said annular rib of said expansion member is disposed at an axial position along said expansion member which is located between said flanged head portion and said second thread means of said expansion member.

22. The assembly as set forth in claim 19, wherein:

said annular rib of said expansion member is disposed at an axial position along said expansion member which is located between said flanged head portion and said second thread means of said expansion member.

* * * * *